3,269,848
CALCIUM ALUMINATE SHAPES
Eldon D. Miller, Jr., Bridgeville, Pa., assignor to Harbison-Walker Refractories Company, Pittsburgh, Pa., a corporation of Pennsylvania
No Drawing. Filed Jan. 3, 1964, Ser. No. 335,667
4 Claims. (Cl. 106—64)

This invention relates to compositions of the calcium aluminate type.

Briefly, according to one aspect of this invention, a stable, high-purity, calcium hexaluminate is prepared as a grain or aggregate. The calcium aluminate grain is mixed with sufficient calcium aluminate cement to bond the grain and up to 30%, by volume, burnout material. The mix is then tempered with water and shaped.

In a preferred embodiment of this invention a stable, high purity, calcium hexaluminate is fabricated as follows: A mixture of ingredients, which yield alpha alumina and calcium oxide temperatures below about 2000° F., is intermixed in the proportions arranged to yield, on an oxide analysis, about $6Al_2O_3$ and $1CaO$, i.e., a 6 to 1 molar ratio. The material selected must yield the $Al_2O_3$ and $CaO$ in the form of particles which are substantially all finer than 150 mesh Tyler, with the major portion thereof (over 50%) passing through a 325 mesh screen. In fact, though I prefer that substantially all the particles be finer than 325 mesh. These fine particles must be intimately mixed or blended with each other. 100 parts, by weight, of these ingredients are then mixed with from 8 to 50 parts water. The resulting mixture may be formed to a desired product shape but, in any event, can be formed as a dobie. (A dobies is language of art for a formed piece which is later worked in some manner to make an ultimate product and which may be, for example, a somewhat plastic texture piece of material which is cut from an extruded rod of wetted ingredients, and then shaped to make a brick etc.) The dobie shape or mixture, as the case may be, is fired to a temperature above about 2100° F., preferably above 2700° F.; but, in no event over 3300° F. and, preferably, no more than about 3000° F. Firing is continued until equilibrium conditions exist (i.e. no further chemical reaction occurs between ingredients), and in which substantially all of the $Al_2O_3$ and $CaO$ have reacted to form $CaO \cdot 6Al_2O_3$ with up to 5% by weight, of materials of the group $CaO \cdot 2Al_2O_3$ and $Al_2O_3$. I have found about 10 hours to be very satisfactory at a temperature in the range 2700 to 3000° F.

A preferred and exemplary mixture of dry ingredients is as follows:

(1) 15.0% $CaCO_3$ and 85.0% alpha alumina
(2) 19.2% $CaSO_4 \cdot \frac{1}{2}H_3O$ and 80.8% alpha alumina
(3) 10.8% $Ca(OH)_2$ and 89.2% of alpha alumina Each of these three mixtures, on a calcined basis (calculated), is equivalent to about 91.6% alpha alumina ($Al_2O_3$) and 8.4% calcia ($CaO$).

Microscopically, the resulting product is crystalline. There is substantially no glass or vitrified phase to be found. The material is porous.

The dobies are crushed to provide a raw material for fabrication of other articles.

The resulting aggregate is combined with calcium aluminate cement, such as Rolandschutte cement, Lumnite cement, etc., in about a 70–30% weight ratio. A workable range for the cement is 15 to 30%, by weight. It would be preferred, however, when mixed with the calcium aluminate cement, that the aggregate by size graded substantially as follows: Substantially all held on a 65 mesh screen, although up to about 10% can be −65 mesh. On the order of about 10% should be about −4+10 mesh, the remainder being −10+28 mesh and −28+65 mesh, in about equal weight proportions. This aggregate-cement mixture may be mixed with about 8 to 14% water and used as a castable to form lightweight high purity insulating brick. It may be mixed with about 10 to 20% water, and used as a gunning mix having excellent insulating characteristics.

If desired, the calcium aluminate cement and calcium hexaluminate aggregate combination can include a burnout material such as sawdust, particulate coke, paper, etc., and equivalent materials recognized by those in the art as useful for this purpose. I do not recommend over about 30%, by volume, of burnout material. Expanded perlite and the like can be used similarly. The resulting fired brick usually have lower use temperatures. For example, using about 30% by volume of perlite, the brick cannot be used above about 2600° F.

The calcium hexaluminate aggregate can be used with fired lighweight aggregates including expanded clays, such as "Haydite" and other calcined fire clays, to form insulating refractories useful at various temperatures.

In the foregoing discussions I have mentioned purity of ingredients in a general manner. It should be understood that high purity at least reagent grade dry ingredients, are called for. Impurities cause shrinkage or expansion. As noted, up to 1% of some ingredients can be added if one wants shrinkage. Thus, as a general rule, I would hold that no more than 1%, by weight, of the batch ingredients, above about 2000° F., can be other than calcia and alpha alumina. Preferably other materials are present in trace amounts only; for example, less than 0.5% and preferably 0.1%, by weight. When other ingredients constitute large proportions of starting materials, complete conversion to calcium hexaluminate does not occur. For example, if one used a commercial grade bauxite and a calcia yielding material, in proportions to obtain the necessary 6:1 molar ratio of $Al_2O_3$ and $CaO$, before the conversion range of 2000 to 3300° F. was reached, such mineral complexes as calcium aluminum silicates, titanates, ferrites, etc. preferentially would begin to occur thereby excluding the formation of a volume stable material predominantly composed of calcium hexaluminate.

Having thus described the invention in detail, and with sufficient particularity as to enable those skilled in the art to practice it, what is desired to have protected by Letters Patent is set forth in the following claims.

I claim:
1. A method of making a refactory shape comprising forming a mixture of 100 parts of dry ingredients which yield alpha alumina and calcia on about a 6 to 1 molar oxide basis at a temperature below 2000° F. and in the form of intimately admixed particles substantially all of which are −150 mesh with the major portion thereof being finer than 325 mesh, said materials at 2000° F. analyzing at least about 99% $Al_2O_3 + CaO$, by weight, on an oxide basis, mixing said dry ingredients with about 8 to 50 parts, by weight, of water, based on the weight of the dry ingredients, forming the resulting wet mixture into self-sustaining shapes, firing said shapes to a temperature in the range 2100 to no more than 3300° F., maintaining said temperature until equilibrium conditions exist, cooling the shapes, crushing them to provide a calcium hexaluminate refractory grain, mixing said grain with sufficient calcium aluminate cement to bond the grain, tempering the calcium hexaluminate grain and calcium aluminate cement mixture with about 8–20%, by weight, of water and forming the resulting mixture into a shape.

2. The method of claim 1 in which the cement amounts to between about 15 and 30%, by weight.

3. The method of claim 1 in which the refractory grain and calcium aluminate cement mixture is combined with burnout material in an amount not exceeding 30%, by volume of the total mixture.

4. The method of claim 1 in which up to about 30%, by volume, of expanded perlite is mixed with the calcium aluminate cement and calcium hexaluminate refractory grain, the resulting mixture is tempered and formed into shapes, and said shapes fired to a temperature in the range 2000 to 2600° F.

References Cited by the Examiner

Gentile et al., Cacium Hexaluminate and Its Stability Relations in the System $CaO=Al_2O_3=SiO_2$, J. Am. Cer. Soc., volume 46, No. 2, February 1963, pages 74–76.

Lee et al., The Chemistry of Cement and Concrete, Ed. Arnold Ltd., London, 2nd Edition, 1956, pages 51–54.

TOBIAS E. LEVOW, *Primary Examiner.*

J. POER, *Assistant Examiner.*